United States Patent
Bhagat

(10) Patent No.: US 10,100,154 B2
(45) Date of Patent: Oct. 16, 2018

(54) HIGH REFRACTIVE INDEX MATERIALS

(71) Applicant: MAGIC LEAP, INC., Plantation, FL (US)

(72) Inventor: Sharad D. Bhagat, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/282,891

(22) Filed: Sep. 30, 2016

(65) Prior Publication Data

US 2017/0096531 A1 Apr. 6, 2017

Related U.S. Application Data

(60) Provisional application No. 62/236,833, filed on Oct. 2, 2015, provisional application No. 62/236,836, filed on Oct. 2, 2015.

(51) Int. Cl.
| | |
|---|---|
| *C08G 75/00* | (2006.01) |
| *C08G 75/024* | (2016.01) |
| *C08G 75/045* | (2016.01) |
| *C08G 75/0209* | (2016.01) |
| *G02B 1/04* | (2006.01) |

(52) U.S. Cl.
CPC ....... *C08G 75/024* (2013.01); *C08G 75/0209* (2013.01); *C08G 75/045* (2013.01); *G02B 1/041* (2013.01)

(58) Field of Classification Search
CPC .......... C08G 75/08; G02B 1/04; C08L 81/00; B29B 13/00; B30B 9/28
See application file for complete search history.

(56) References Cited

U.S. PATENT DOCUMENTS

| | | |
|---|---|---|
| 8,470,948 B2 | 6/2013 | Stiegman |
| 8,975,356 B2 | 3/2015 | Stiegman |
| 2016/0289395 A1 * | 10/2016 | Stiegman ............... C08G 77/60 |

OTHER PUBLICATIONS

Sharad D. Bhagat et al., High refractive index optical polymers based on thiol-ene cross-linking using polarizable inorganic/organic monomers, Macromolecules, 45 (2012) 1174-1181.

(Continued)

*Primary Examiner* — Shane Fang
(74) *Attorney, Agent, or Firm* — Fish & Richardson P.C.

(57) ABSTRACT

In some cases, fabricating a high refractive index polymer composite may include combining a thiol monomer and an ene monomer to yield a composite mixture, heating the composite mixture to yield a homogenous composite mixture, and curing the homogeneous composite mixture to yield a polymer composite, wherein the ene monomer comprises zirconium oxo (meth)acrylate clusters. The refractive index of the high refractive index polymer composite may be at least 1.70. In certain cases, fabricating a high reactive index polymer composite includes combining a vinyl (ene) monomer, a thiol monomer, and zirconium oxo (meth) acrylate clusters to yield a composite mixture, heating the composite mixture to yield a homogenous composite mixture, and curing the homogeneous composite mixture to yield a polymer composite. The refractive index of the high refractive index polymer composite may be at least 1.75.

10 Claims, 2 Drawing Sheets

(56) References Cited

OTHER PUBLICATIONS

Sharad D. Bhagat et al., High refractive index polymer composites Synthesized by Cross-Linking of Oxo-zirconium Clusters through thiol-ene polymerization. Macromolecular Materials and Engineering, 300 (6) (2015) 580-585.

G. Kickelbick et al., Oxozirconium Methacrylate Clusters: $Zr_6(OH)_4O_4(OMc)_{12}$ and $Zr_4O_2(OMc)_{12}$ (OMc=Methacrylate). Chem. Ber. Recueil, 130 (1997) 473-477.

* cited by examiner

HIGH REFRACTIVE INDEX MATERIALS

CROSS-REFERENCE TO RELATED APPLICATIONS

This application claims the benefit of U.S. application Ser. No. 62/236,833 entitled "HIGH REFRACTIVE INDEX MATERIALS" filed on Oct. 2, 2015, and U.S. application Ser. No. 62/236,836 entitled "HIGH REFRACTIVE INDEX MATERIALS" filed on Oct. 2, 2015, both of which are incorporated by reference herein in their entirety.

TECHNICAL FIELD

This specification generally relates to high refractive index materials.

BACKGROUND

Thiol-ene chemistry or "click" chemistry has been in existence for more than a century, and numerous materials have been developed using this approach. However, widescale exploitation of optical materials prepared via thiol-ene chemistry has generally been limited by the optical properties of these materials.

SUMMARY

In a first general aspect, fabricating a high refractive index polymer composite includes combining a thiol monomer and an ene monomer to yield a composite mixture, heating the composite mixture to yield a homogenous composite mixture, and curing the homogeneous composite mixture to yield a polymer composite, wherein the ene monomer comprises zirconium oxo (meth)acrylate clusters.

Implementations of the first general aspect may include one or more of the following features.

In some cases, the ene monomer consists essentially of the zirconium oxo (meth)acrylate clusters. In certain cases, a majority of the ene monomer is zirconium oxo (meth)acrylate clusters. In still other cases, the zirconium oxo (meth)acrylate clusters include 5-100 wt %, 10-100 wt %, 15-100 wt %, 20-100 wt %, 25-100 wt %, 50-100 wt %, 75-100 wt %, or 90-100 wt % of the ene monomer. In one example, the zirconium oxo (meth)acrylate clusters include $Zr_6(OH)_4O_4(O_2C(CH_3)=CH_2)_{12}$, $Zr_4O_2(O_2C(CH_3)=CH_2)_{12}$, $Zr_6(OH)_4O_4(O_2CH=CH_2)_{12}$, $Zr_4O_2(O_2CH=CH_2)_{12}$, or a combination thereof.

The polymer composite may have a refractive index of at least 1.70. The refractive index may be less than 1.79 or less than 1.80.

A second general aspect includes a polymer composite formed as described with respect to the first general aspect.

A third general aspect includes a polymer composite including the reaction product of a thiol monomer and a zirconium oxo acrylate or methacrylate, wherein the wherein the refractive index of the polymer composite exceeds 1.70.

In some cases, the refractive index of the polymer composite of the third general aspect is less than 1.79 or less than 1.80.

A fourth general aspect includes a polymer composite including the reaction product of a thiol monomer and a zirconium oxo acrylate or methacrylate.

Implementations of the fourth general aspect may include one or more of the following features.

In some cases, the polymer composite consists essentially of the reaction product of the thiol monomer and the zirconium oxo acrylate or methacrylate. The refractive index of the polymer composite typically exceeds 1.70. The refractive index of the polymer composite may be less than 1.79 or less than 1.80.

In a fifth general aspect, fabricating a high reactive index polymer composite includes combining a vinyl (ene) monomer, a thiol monomer, and zirconium oxo (meth)acrylate clusters to yield a composite mixture, heating the composite mixture to yield a homogenous composite mixture, and curing the homogeneous composite mixture to yield a polymer composite.

Implementations of the fifth general aspect may include one or more of the following features.

In some cases, combining the vinyl (ene) monomer, the thiol monomer, and zirconium oxo (meth)acrylate clusters includes adding the zirconium oxo (meth)acrylate clusters to the vinyl (ene) monomer to yield a first mixture, and combining the thiol monomer with the first mixture to yield the composite mixture. The zirconium oxo (meth)acrylate clusters may include between 1 wt % and 15 wt % of the composite mixture, between 5 wt % and 15 wt % of the composite mixture, or between 10 wt % and 15 wt % of the composite mixture. Heating the composite mixture to yield the homogeneous composite mixture may include dissolving the zirconium oxo (meth)acrylate clusters. Heating the composite mixture typically includes heating the composite mixture to a temperature above 25° C. In some examples, heating the composite mixture includes heating the composite mixture to at least 50° C., at least 75° C., at least 100° C., or at least 125° C.

The polymer composite may have a refractive index exceeding 1.75. In some cases, the polymer composite has a refractive index of at least 1.76, at least 1.77, or at least 1.78. The polymer composite may have a refractive index of less than 1.79 or less than 1.80.

A sixth general aspect includes a polymer composite formed according to the fifth general aspect, wherein the refractive index of the polymer composite exceeds 1.75.

Implementations of the sixth general aspect may include one or more of the following features.

In some cases, the polymer composite has a refractive index of at least 1.76, at least 1.77, or at least 1.78. In certain cases, the refractive index of the polymer composite is less than 1.79 or less than 1.80.

A seventh general aspect includes a polymer composite including the reaction product of a vinyl (ene) monomer, a thiol monomer, and zirconium oxo (meth)acrylate clusters, wherein the wherein the refractive index of the polymer composite exceeds 1.75.

Implementations of the seventh general aspect may include one or more of the following features.

In some cases, the polymer composite has a refractive index of at least 1.76, at least 1.77, or at least 1.78. In certain cases, the refractive index of the polymer composite is less than 1.79 or less than 1.80.

In an eighth general aspect, a polymer composite includes the product of a mixture comprising a vinyl (ene) monomer, a thiol monomer, and zirconium oxo (meth)acrylate clusters, wherein the zirconium oxo (meth)acrylate clusters comprise between 1 wt % and 15 wt % of the mixture, between 5 wt % and 15 wt % of the mixture, or between 10 wt % and 15 wt % of the mixture.

Implementations of the eighth general aspect may include one or more of the following features.

In some cases, the wherein the refractive index of the polymer composite exceeds 1.75. In certain cases, the polymer composite has a refractive index of at least 1.76, at least 1.77, or at least 1.78. In still other cases, the refractive index of the polymer composite is less than 1.79 or less than 1.80.

Implementations of the first through eighth general aspects may include one or more of the following features.

The ene monomer may include a trivinyl monomer, a trialyl monomer, a tetravinyl monomer, a tetra-allyl monomer, or any combination thereof. In some examples, the ene monomer may include one of:

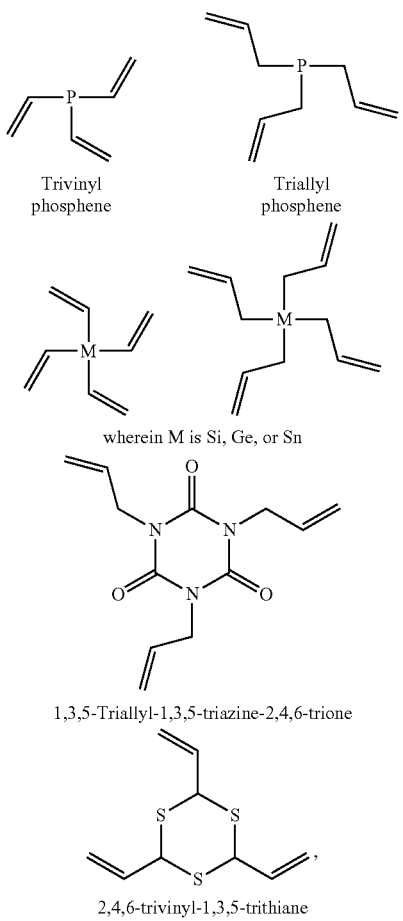

or any combination thereof.

The thiol monomer may include 1,2-ethanedithiol, 1,5-pentanedithiol, 1,3-benzenedithiol, or a combination thereof.

A ninth general aspect includes an optical element including the polymer composite of any one of the first through the eighth general aspects. In implementations of the ninth general aspect, the optical element may include a lens.

DETAILED DESCRIPTION

High refractive index materials typically include constituent elements with high molecular polarizability. Constituent elements with higher molecular polarizability generally lead to materials with higher refractive indices. Elements with higher molecular polarizability include S, P, Ge, Zr, Ti, Si, and the like, as well as certain organic compounds such as those containing aromatic structures (e.g., benzene rings). In some cases, highly polarizable elements are doped into a host polymer matrix. Higher amounts of these elements enhance the refractive indices of the host materials to even higher values. In one example, high refractive index polymers are fabricated through incorporation of Zr-oxo-clusters (ZOCs) into a thiol-ene matrix. "ZOCs" generally refer to zirconium oxo (meth)acrylate clusters. "Zirconium oxo" and "oxo zirconium" are used interchangeably herein, and "zirconium oxo (meth)acrylate clusters" include zirconium oxo acrylate clusters, zirconium oxo acrylate clusters, and any combination thereof. Polymer composites based on thiol-ene and Zr-oxo-clusters (ZOCs) have been prepared via a process that includes dissolving ZOCs in ene (vinyl) monomer at room temperature, filtering the excess ZOCs from the ene monomer, and then adding thiol monomer to achieve polymerization, thereby forming a polymer composite. This process, and thus the refractive index of the resulting polymer composite, is limited by the solubility of ZOCs (typically up to 1 wt %) in the vinyl (ene) monomer.

Figure 1:
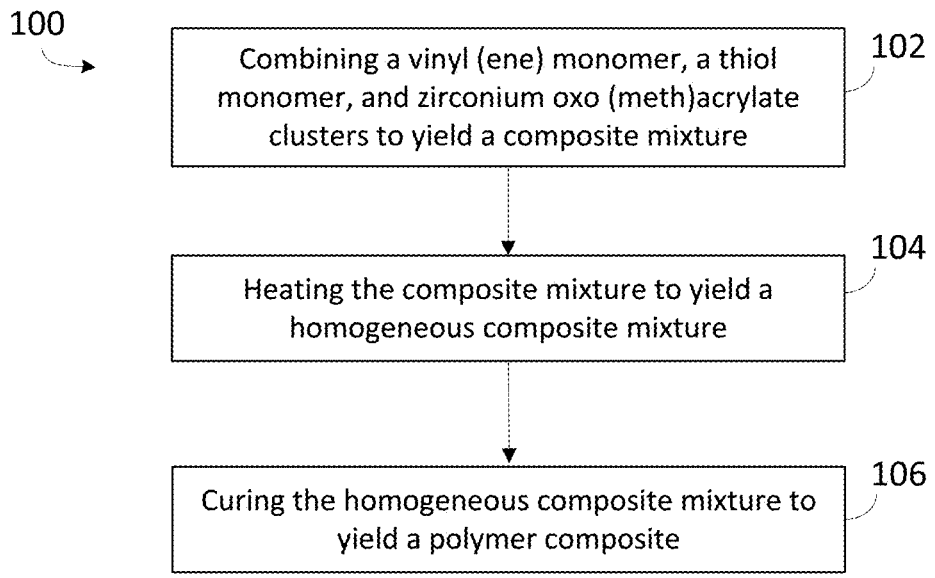
FIG. 1 depicts a first process for fabricating high refractive index materials.

FIG. 1 depicts a process 100 for fabricating high refractive index materials. This process achieves a higher loading of ZOCs in the host material, thereby yielding polymer composites with refractive indices exceeding 1.75. In 102, a vinyl (ene) monomer, a thiol monomer, and zirconium oxo(methacrylate) clusters are combined to yield a composite mixture. In some cases, the vinyl (ene) monomer, ZOCs, and thiol monomer are combined sequentially to yield a composite mixture. In one example, the ZOCs are combined with the vinyl (ene) monomer, and the thiol monomer is then added to yield the composite mixture. However, the order of addition may be varied (e.g., the vinyl (ene) monomer and the thiol monomer may be combined first to yield a monomer mixture, and the ZOCs added to the monomer mixture; or the ZOCs may be combined with the thiol monomer, to which the vinyl (ene) monomer is subsequently added). The vinyl monomer and thiol monomer are typically combined in molar ratio such that number of vinyl groups equals number of thiol groups in the final monomer solution. ZOCs are typically added in an amount between 1 wt % and 15 wt % of the mixture (e.g., between 5 wt % and 15 wt %, or between 10 wt % and 15 wt %).

Suitable vinyl monomers include, for example, trivinyl, trialyl, tetravinyl, and tetra-allyl monomers such as those depicted below, where M is Si, Ge, Sn, or the like.

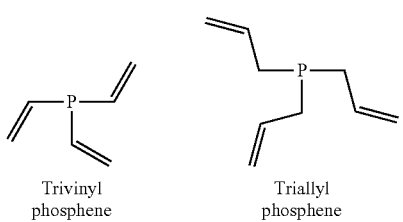

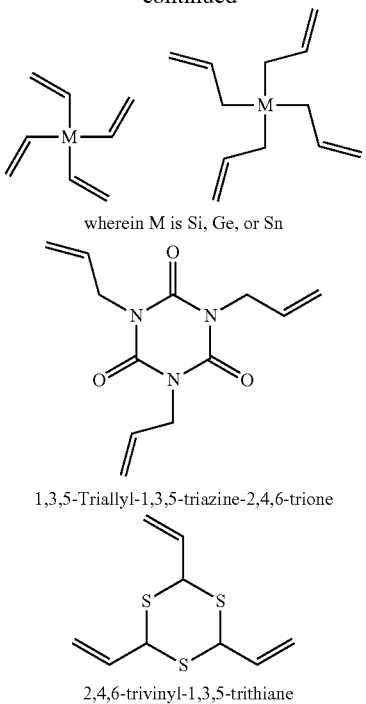

wherein M is Si, Ge, or Sn 1,3,5-Triallyl-1,3,5-triazine-2,4,6-trione 2,4,6-trivinyl-1,3,5-trithiane Suitable thiol monomers include, for example, 1,2-ethanedithiol, 1,5-pentanedithiol, and 1,3-benzenedithiol, depicted below.

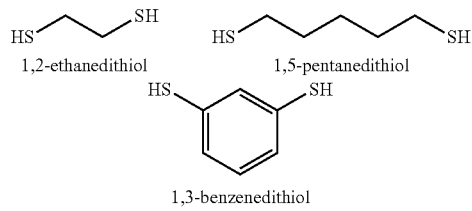

1,2-ethanedithiol        1,5-pentanedithiol 1,3-benzenedithiol

Suitable ZOCs include zirconium oxo acrylate or methacrylate clusters, such as $Zr_6(OH)_4O_4(O_2C(CH_3)=CH_2)_{12}$, $Zr_4O_2(O_2C(CH_3)=CH_2)_{12}$, $Zr_6(OH)_4O_4(O_2CH=CH_2)_{12}$, $Zr_4O_2(O_2CH=CH_2)_{12}$], and the like. The composite mixture may include any combination of one or more vinyl (ene) monomers and one or more thiol monomers.

One or more components of the mixture (e.g., the vinyl monomer, the thiol monomer, or both) may be heated prior to forming the composite mixture.

In 104, the composite mixture is heated (e.g., in a closed container) to dissolve the ZOCs in the composite mixture, thereby yielding a homogenous composite mixture. The homogeneous composite mixture is typically transparent. The monomers, the composite mixture, or any combination thereof may be heated (e.g., above room temperature) to dissolve the ZOCs. In some examples, the composite mixture is heated a temperature exceeding 25° C. (e.g., at least 50° C., at least 75° C., at least 100° C., or at least 125° C.) to yield a viscous, homogenous composite mixture free of undissolved ZOCs. In one example, the composite mixture is heated for about 30 minutes at 125° C. Excess ZOCs are not obtained upon filtration of the homogeneous composite mixture. As such, filtration to remove excess ZOCs is unnecessary, thereby streamlining the fabrication process while allowing a higher loading of ZOCs.

Polymerization begins during heating of the mixture, thereby promoting solution of ZOCs as the reaction proceeds. In 106, the homogeneous composite mixture is cured to yield a polymer composite. In some cases, the homogenous composite mixture is cured in an air atmosphere for a length of time (e.g., at least 12 hours) to yield a high refractive index polymer composite. Polymer composites prepared by the process described in FIG. 1 may have refractive indices greater than 1.75, greater than 1.76, greater than 1.77, or greater than 1.78, and typically less than 1.80 (e.g., less than 1.79). Polymer composites prepared by the process described in FIG. 1 may have refractive indices greater than 1.75, greater than 1.76, greater than 1.77, or greater than 1.78.

Figure 2:
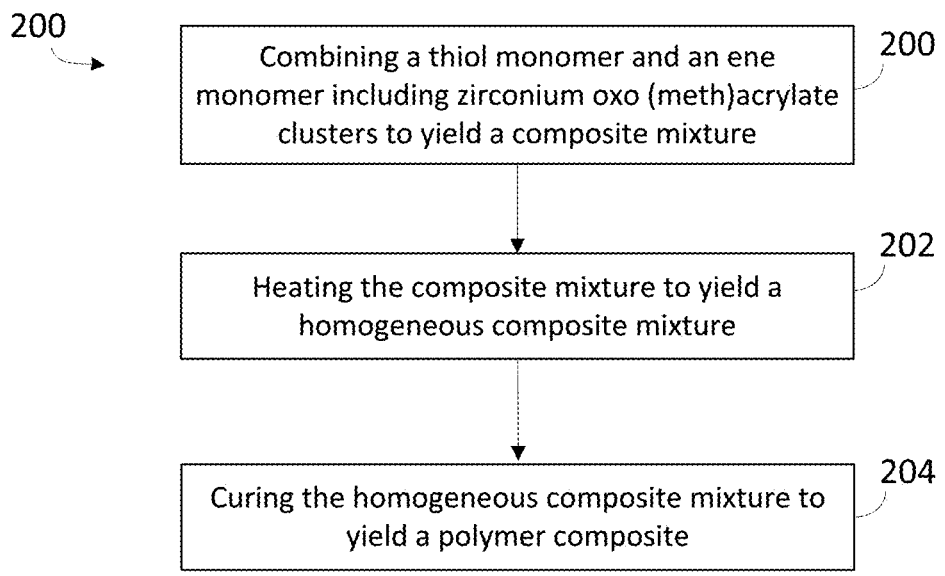
FIG. 2 depicts a second process for fabricating high refractive index materials.

FIG. 2 depicts a process 200 for preparing high refractive index materials by crosslinking ZOCs with thiol monomers to yield polymer composites with enhanced optical properties. These free-standing polymer composites—more glasslike that doped polymer composites—are rigid, highly transparent optical polymers with high inorganic content and high crystallinity. They demonstrate advantageous optical and mechanical properties, and can exhibit refractive indices above 1.70.

In 202, an thiol monomer and an ene monomer including ZOCs are combined to yield a composite mixture. In 204, the composite mixture is heated to yield a homogeneous composite mixture. In 206, the homogeneous composite mixture is cured to yield a polymer composite. Process 200 includes crosslinking ZOCs with thiol monomers. Suitable ZOCs function as ene monomers, and include $Zr_6(OH)_4O_4(O_2C(CH_3)=CH_2)_{12}$, $Zr_4O_2(O_2C(CH_3)=CH_2)_{12}$, $Zr_6(OH)_4O_4(O_2CH=CH_2)_{12}$, $Zr_4O_2(O_2CH=CH_2)_{12}$, and the like. Suitable thiol monomers typically have at least two thiol functional groups, and include 1,2-ethanedithiol, 1,5-pentanedithiol, and 1,3-benzenedithiol, shown below.

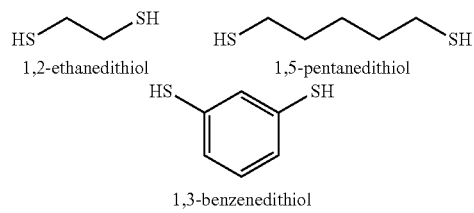

1,2-ethanedithiol        1,5-pentanedithiol 1,3-benzenedithiol

One or more suitable ZOCs may be reacted with one or more suitable thiol groups to yield a polymer composite with a high refractive index. The ZOCs and the thiol monomer are typically combined in a molar ratio such that number of vinyl groups equals number of thiol groups in the composite mixture.

Figure 3:
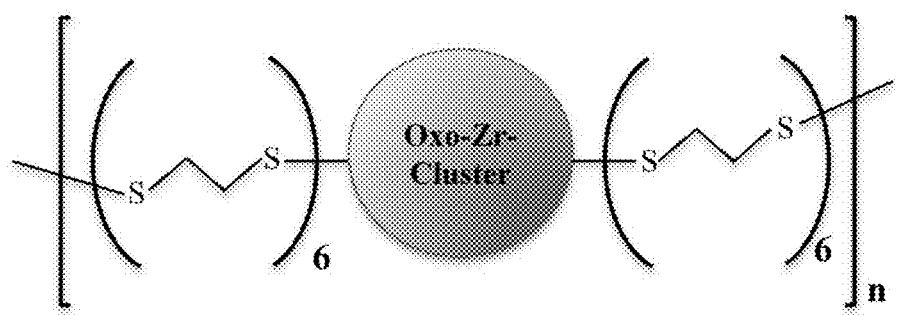
FIGS. 3-5 depict repeat units for high refractive index materials.
Figure 4:
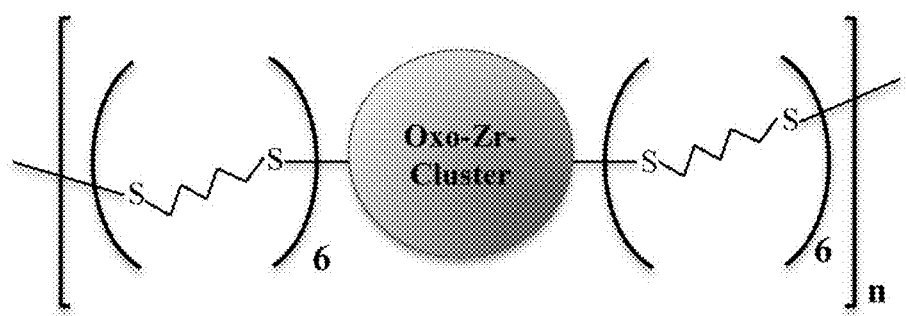
Figure 5:
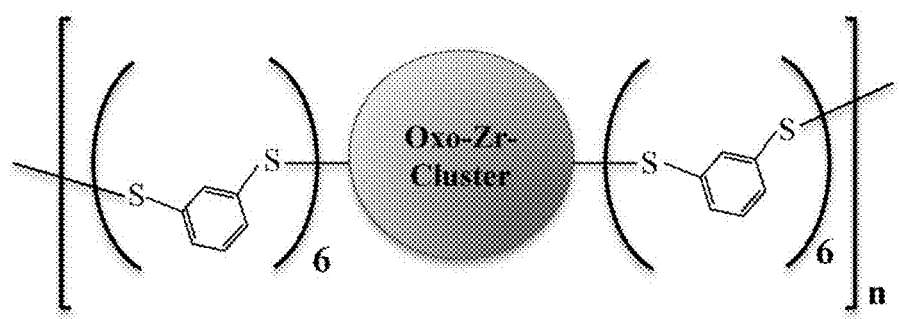

Polymer composites formed as described may include one or more of the repeating units shown in FIGS. 3-5, in which "Oxo-Zr-Cluster" may be one or more of $Zr_6(OH)_4O_4(O_2C(CH_3)=CH_2)_{12}$, $Zr_4O_2(O_2C(CH_3)=CH_2)_{12}$, $Zr_6(OH)_4O_4(O_2CH=CH_2)_{12}$, $Zr_4O_2(O_2CH=CH_2)_{12}$, and the like. The zirconium oxo clusters (ZOCs) provide—ene (vinyl) functionalities to form polymers through crosslinking with thiol monomers. Unlike polymer composites in which ZOCs are included as dopants, these polymer composites are formed with a majority of the ene reactant in the form of ZOCs.

ZOCs may provide 1-100 wt % of the ene monomer in the composite mixture (e.g., 5-100 wt %, 10-100 wt %, 15-100 wt %, 20-100 wt %, 25-100 wt %, 50-100 wt %, 75-100 wt %, or 90-100 wt %). In certain cases, ZOCs provide a majority of ene monomer in the composite mixture. The ene monomer may consist essentially of ZOCs. That is, the ZOCs may provide all or substantially all the ene functionality in the composite mixture. Examples of other ene monomers suitable for use in combination with ZOCs are shown below, where M is Si, Ge, or Sn:

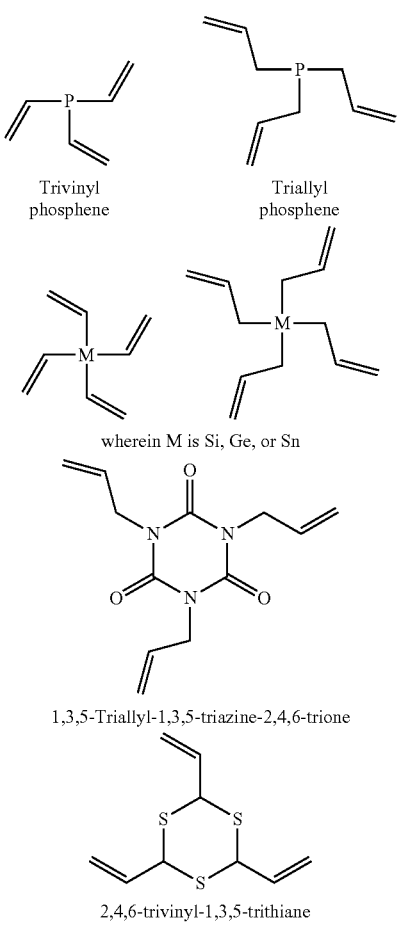

The reactant monomers (e.g., ene monomer and thiol monomer) can be combined in a stoichiometric ratio, with the number of available ene groups equal to the number of thiol groups, or any molar ratio (e.g., less than or greater than the stoichiometric ratio) effective to yield a polymer composite in the form of a free-standing polymer.

Polymer composites described herein are suitable for use as optical elements, such as lenses.

A number of embodiments have been described. Nevertheless, it will be understood that various modifications may be made without departing from the spirit and scope of the disclosure.

What is claimed is:

1. A method of fabricating a high refractive index polymer composite, the method comprising:
    combining a thiol monomer and an ene monomer to yield a composite mixture;
    heating the composite mixture to yield a homogenous composite mixture; and
    curing the homogeneous composite mixture to yield a polymer composite,
    wherein the ene monomer comprises zirconium oxo (meth)acrylate clusters, and the zirconium oxo (meth) acrylate clusters provide 50 wt % to 100 wt % of the ene monomer in the composite mixture.

2. The method of claim 1, wherein the zirconium oxo (meth)acrylate clusters comprise $Zr_6(OH)_4O_4(O_2C(CH_3)=CH_2)_{12}$, $Zr_4O_2(O_2C(CH_3)=CH_2)_{12}$, $Zr_6(OH)_4O_4(O_2CH=CH_2)_{12}$, $Zr_4O_2(O_2CH=CH_2)_{12}$, or a combination thereof.

3. The method of claim 1, wherein the thiol monomer comprises 1,2-ethanedithiol, 1,5-pentanedithiol, 1,3-benzenedithiol, or a combination thereof.

4. The method of claim 1, wherein the refractive index of the polymer composite is at least 1.70.

5. The method of claim 1, wherein the zirconium oxo (meth)acrylate clusters provide a majority of the ene monomers by wt % in the composite mixture.

6. The method of claim 1, wherein the zirconium oxo (meth)acrylate clusters provide 75 wt % to 100 wt % of the ene monomer in the composite mixture.

7. A polymer composite formed by the method of claim 4.

8. An optical element comprising the polymer composite of claim 7.

9. The optical element of claim 8, wherein the optical element comprises a lens.

10. The method of claim 6, wherein the zirconium oxo (meth)acrylate clusters provide 90 wt % to 100 wt % of the ene monomer in the composite mixture.

* * * * *